(12) United States Patent
Turek et al.

(10) Patent No.: US 12,181,061 B2
(45) Date of Patent: Dec. 31, 2024

(54) VALVE ASSEMBLY

(71) Applicant: Goodrich Corporation, Charlotte, NC (US)

(72) Inventors: Lukasz Turek, Wroclaw (PL); Dariusz Celestyn Sapija, Kielczowek (PL)

(73) Assignee: GOODRICH CORPORATION, Charlotte, NC (US)

( * ) Notice: Subject to any disclaimer, the term of this patent is extended or adjusted under 35 U.S.C. 154(b) by 197 days.

(21) Appl. No.: 17/952,766

(22) Filed: Sep. 26, 2022

(65) Prior Publication Data

US 2023/0132209 A1 Apr. 27, 2023

(30) Foreign Application Priority Data

Oct. 26, 2021 (EP) .................................... 21461607

(51) Int. Cl.
| | |
|---|---|
| *F16K 15/18* | (2006.01) |
| *B64D 25/14* | (2006.01) |
| *F16K 15/02* | (2006.01) |
| *F16K 35/02* | (2006.01) |

(52) U.S. Cl.
CPC ............ *F16K 15/182* (2021.08); *B64D 25/14* (2013.01); *F16K 15/02* (2013.01); *F16K 35/025* (2013.01)

(58) Field of Classification Search
CPC ........ F16K 15/182; F16K 15/02; F16K 29/00; F16K 31/5286; B64D 25/14; Y10T 137/6253
USPC ......................................................... 251/56
See application file for complete search history.

(56) References Cited

U.S. PATENT DOCUMENTS

| | | | | |
|---|---|---|---|---|
| 1,891,533 | A | * 12/1932 | Gish ................... | F16K 31/5286 251/252 |
| 1,943,276 | A | * 1/1934 | Miller ............... | F16K 31/52425 137/331 |
| 1,960,014 | A | * 5/1934 | Edwin ................. | F16K 15/02 137/516.21 |
| 2,952,269 | A | * 9/1960 | Stehlin ............... | F16K 31/5286 137/625.42 |
| 3,845,781 | A | * 11/1974 | Hansen ................ | F16K 15/026 137/542 |
| 4,006,919 | A | | 2/1977 Neuman | |
| 4,648,534 | A | * 3/1987 | Esser .................. | F16K 31/5286 222/511 |

(Continued)

OTHER PUBLICATIONS

EPO Search Report, Extended Search Report dated Apr. 28, 2022 with EP Serial No. 21461607.0.

*Primary Examiner* — Kenneth Rinehart
*Assistant Examiner* — Nicole Gardner
(74) *Attorney, Agent, or Firm* — SNELL & WILMER L.L.P.

(57) ABSTRACT

A valve assembly, comprising: a valve housing body extending along a longitudinal axis X between a first end and a second end and defining a cylindrical passage therethough from the first to the second end; a fluid inlet at the first end for receiving a pressurized fluid; and a fluid outlet provided in between the first and second end of the housing body; and a piston provided in said cylindrical passage, said piston being axially movable between a first position wherein said fluid outlet is blocked by said piston such that the piston blocks the flow of fluid from the inlet to the outlet, and a second position wherein said outlet is not blocked by said piston and a fluid flow path is formed from the inlet to the outlet.

15 Claims, 13 Drawing Sheets

(56) References Cited

U.S. PATENT DOCUMENTS

| | | |
|---|---|---|
| 6,431,197 B2 | 8/2002 | Hintzman et al. |
| 10,293,949 B2 | 5/2019 | John et al. |
| 2008/0110330 A1* | 5/2008 | Reymann ................ E04G 21/04 92/31 |
| 2016/0201824 A1* | 7/2016 | Frosch .................. F16K 31/041 251/215 |
| 2020/0354067 A1 | 11/2020 | Haynes et al. |
| 2021/0293347 A1 | 9/2021 | Tarnowski et al. |

* cited by examiner

Gas flow through output port to EVAC slide

VALVE ASSEMBLY

CROSS-REFERENCE TO RELATED APPLICATIONS

This application claims priority to, and the benefit of, EP Patent Application No. 21461607.0, filed Oct. 26, 2021 and titled "VALVE ASSEMBLY," which is incorporated by reference herein in its entirety for all purposes.

FIELD

The present disclosure relates to valve assemblies for regulating the flow of pressurized fluids. Such assemblies may be used, for example, and not exclusively, to control the flow of a hydraulic fluid e.g. pressurized gas to an inflatable device such as an evacuation slide or raft in an aircraft.

BACKGROUND

In some known pneumatic or hydraulic systems, two stage valves are used to fulfil safety or redundancy requirements. An example is a two-stage valve in an inflation system for inflating an inflatable evacuation slide or raft or the like. In such systems, typically, a source of pressurized gas is provided and connected, via a normally closed valve, to the stowed inflatable slide or the like. To inflate the slide, the valve is opened to allow the pressurized gas to flow into the inflatable. A primary valve may be provided to initially charge the pressurized fluid ready for use and a secondary valve, such as the two stage valve described may be opened to quickly release the stored pressurized fluid to inflate the slide or the like. Such valves may also be used in other applications where the flow of a pressurized fluid is to be regulated. The valves typically comprise a piston which blocks a pressurized fluid input. Such pistons are typically initially held against a pressurized fluid input by mechanical means such as a pin or bracket. Upon release of the piston, it moves away from the input under the force of the fluid and opens a flow passage for the fluid from the input to a valve output. In such designs, the released piston travels at a high velocity due to the pressurized input fluid and the impact of the piston against the housing of the valve due to its kinetic energy when it reaches the end of its travel can cause damage to valve components.

There is, therefore, a need for a valve assembly in which this impact is reduced without compromising performance or reducing the input pressure.

SUMMARY

According to the disclosure, there is provided a valve assembly, comprising: a valve housing body extending along a longitudinal axis X between a first end and a second end and defining a cylindrical passage therethough from the first to the second end; a fluid inlet at the first end for receiving a pressurized fluid; and a fluid outlet provided in between the first and second end of the housing body; and a piston provided in said cylindrical passage, said piston being axially movable between a first position wherein said fluid outlet is blocked by said piston such that the piston blocks the flow of fluid from the inlet to the outlet, and a second position wherein said outlet is not blocked by said piston and a fluid flow path is formed from the inlet to the outlet; and wherein said valve assembly further comprises a helical guide groove formed in the cylindrical passage and the piston comprises radially extending guide pins configured to engage in the helical guide groove such that as the piston moves axially from the first position, the guide pins travel along the helical guide groove to cause rotation of the piston relative to the housing body, and the valve assembly further comprising a circumferential groove at an end of the helical guide grooves such that the guide pins travel from the helical guide grooves into the circumferential groove, wherein when piston is in the second position the guide pins rotate around the circumferential groove.

In any embodiment, the assembly may also be provided with a blocking mechanism e.g. a firing pin and cable, to block the piston in the first position until released.

In any embodiment, a plug may be provided to close the second end of the housing. The plug may be configured to allow repositioning of the piston after use.

The outlet may be in fluid communication with an inflatable device such as an aircraft evacuation slide or chute.

The assembly may for a secondary valve in communication with a primary valve operable to open a flow passage from a source of pressurized fluid to the inlet.

DETAILED DESCRIPTION

Figure 1A:
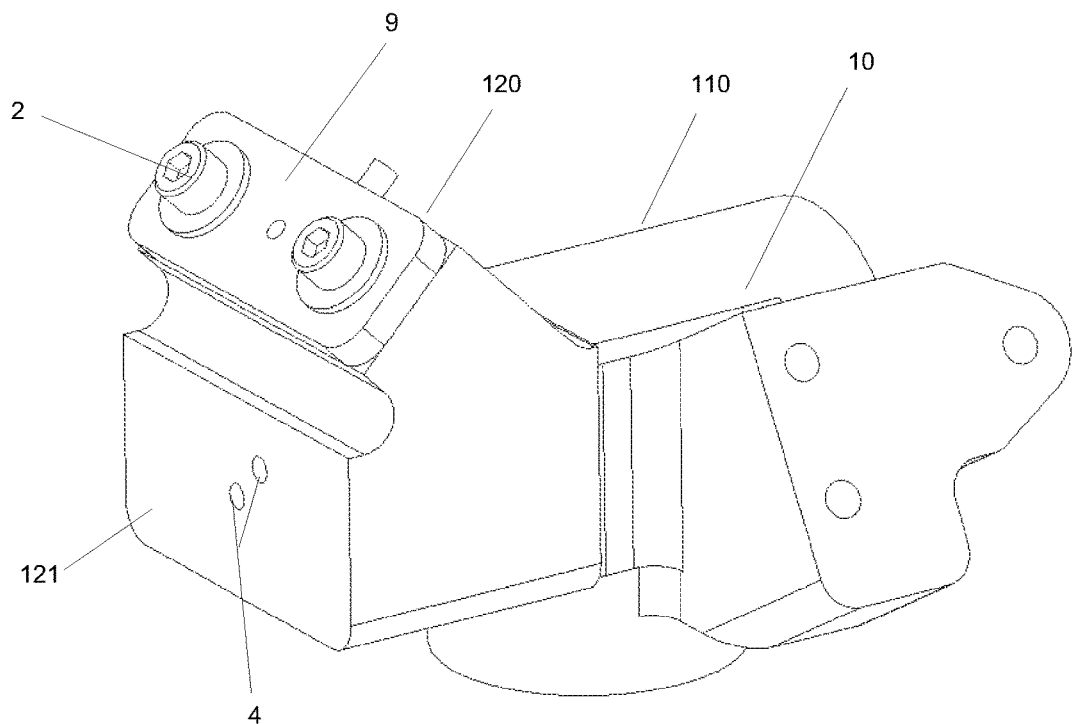
FIG. 1A is a perspective view of a known valve assembly such as described above.

An example of a known valve assembly 1 is illustrated in FIGS. 1A and 1B and 2A and 2B. The assembly includes a valve body 10 arranged to be mounted e.g. to another assembly e.g. an aircraft or evacuation assembly or other body depending on the application of the valve assembly. The housing includes a first housing part 110 that extends along a longitudinal axis x from a first end 11 to a second end 12 and that defines an axial piston cylinder 13 between the first and second ends within which a piston 130 (described further below) moves axially. The first end 11 of the first housing part 110 defines a pressurized fluid inlet 111 arranged to be in fluid communication with a pressurized fluid source (not shown). The other end 12 of the first housing part 110 is closed by an end wall 121. A pressurized fluid outlet 112 is defined in the wall of the axial piston cylinder 130 part-way between the first and second ends. The outlet 112 is arranged to be connected to the load that is to receive the pressurized fluid when the valve assembly is open e.g. an inflatable evacuation device.

Figure 1B:
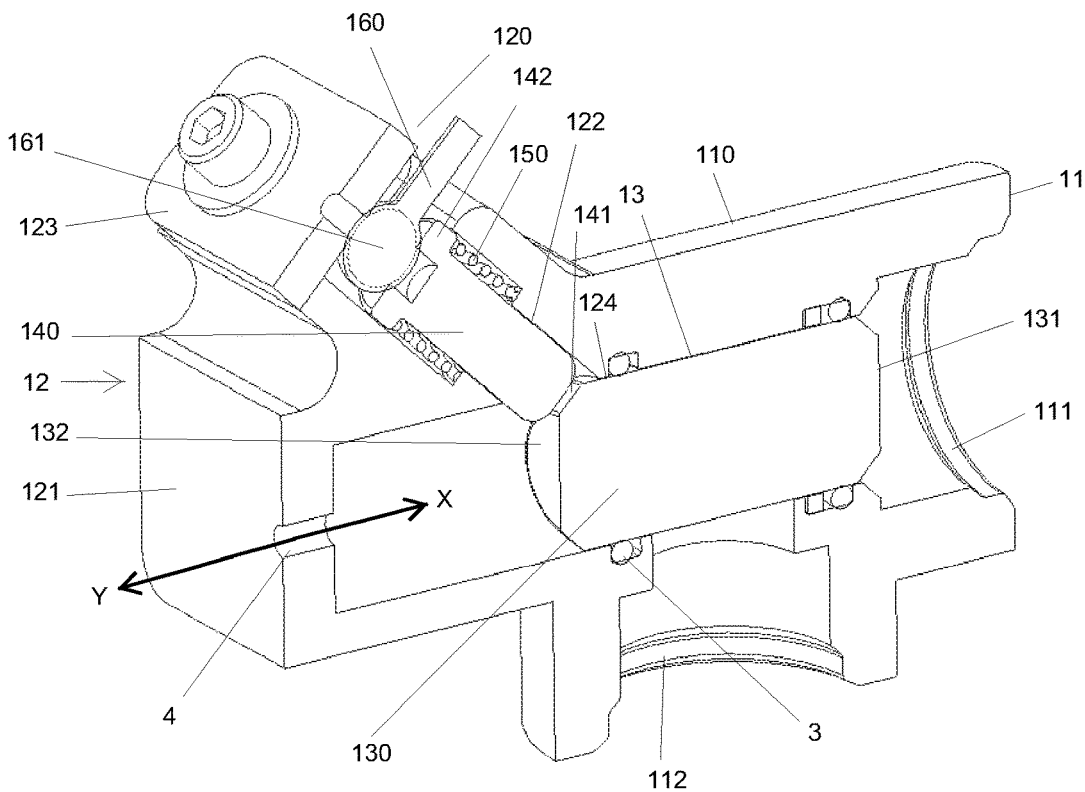
FIG. 1B is a cut-away view of the assembly of FIG. 1A showing the blocked position of the valve.

A piston 130 is provided in the axial piston cylinder 13 for axial movement within the cylinder between the ends 11, 12. In a blocking position, the piston is positioned in the piston cylinder as shown in FIG. 1B where the piston is located so as to block the flow channel from the pressurized fluid inlet 111 to the pressurized fluid outlet 112. The piston is positioned in the cylinder 13 across the opening of the outlet 112. Because the piston is dimensioned to have a close fit in the cylinder 13, flow is not possible from the inlet to the outlet. Additional seals 3 can be provided around the piston to avoid leakage of fluid past the piston in the cylinder.

The piston 130 divides the axial piston cylinder 13 into a first chamber A between a first end 131 of the piston 130 and the first end 11 of the first housing part 110, and a second chamber B between a second end 132 of the piston 130 and the second end 12 of the first housing part.

One or more drainage holes 4 may be provided in the end wall 121 at the second end 12.

The housing 10 includes a second housing part 120 that branches off from the first housing part 110 and which defines a firing pin cylinder 122 between a first, closed end 123 (which may be in the form of a cap or closure affixed by e.g. screws 2) and a second, open end 124 where the firing pin cylinder 122 meets the axial piston cylinder 13. A firing pin 140 is mounted in the firing pin cylinder and arranged for movement along the firing pin cylinder relative to the axial piston cylinder 13. In a first position, the firing pin 140 extends out of the firing pin cylinder such that an end 141 of the firing pin protrudes into the axial piston cylinder 13. In a second position, the firing pin 140 is fully retracted into the firing pin cylinder 122 so that it does not protrude into the piston cylinder. Other types of blocking device and trigger or release are also known for moving the valve to its open position, but the firing pin is described here by way of example.

The firing pin 140 is mounted for slidable movement in the firing pin cylinder 122 by means of a compression spring 150, which is held in its compressed state, as shown in FIG. 1B, by means of a firing cable device 160, an end 161 of which is located between the compression spring 150 secured around a second end 142 of the firing pin 140 and the closed end 123 of the firing pin cylinder. A pull part 162 of the firing cable device 160 extends from the end 161 out through a wall of the second housing part 120.

In use, the default position of the valve assembly is the closed position as shown in FIG. 1B, whereby the piston 130 is located between the inlet 111 and the outlet 112 to prevent flow of the pressurized fluid from the inlet to the outlet. The piston 130 is held in this blocked position by means of the pressurized fluid in chamber A, from the inlet 111 acting on the first end 131 of the piston and the firing pin 140 protruding into the piston cylinder 13 and abutting against the second end 132 of the piston 130 and acting against the force of the pressurized fluid. In this position, the firing pin is biased to protrude into the piston cylinder 13 by the presence of the firing cable device end 161 acting against the second end of the firing pin and holding the spring 150 in its compressed state. The pressure in chamber B is lower than in chamber A but the piston is prevented from moving towards the closed end 121 of the piston housing by means of the firing pin.

Figure 2A:
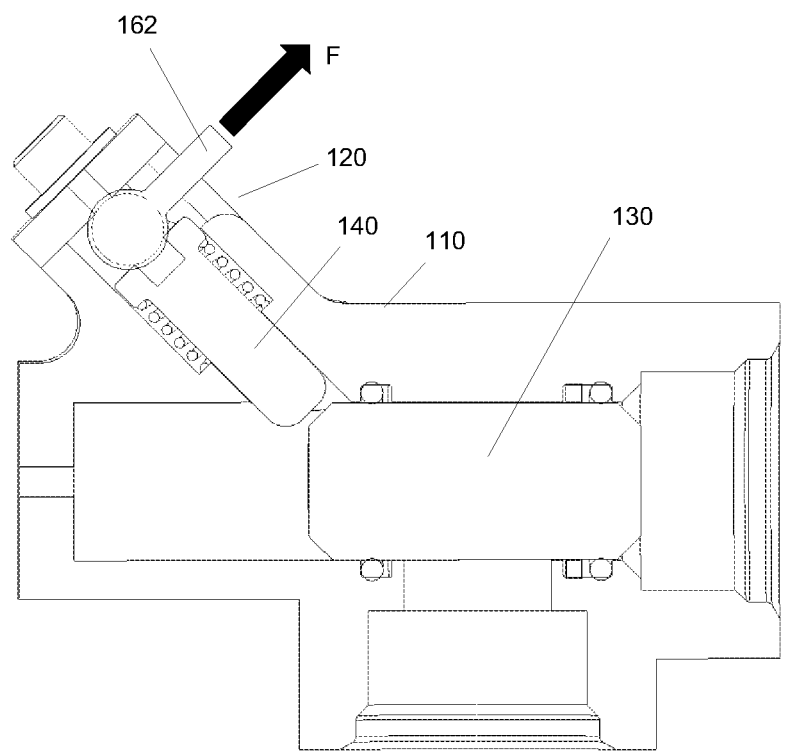
FIG. 2A is a sectional view of a valve assembly of FIGS. 1A and 1B as the piston is released.
Figure 2B:
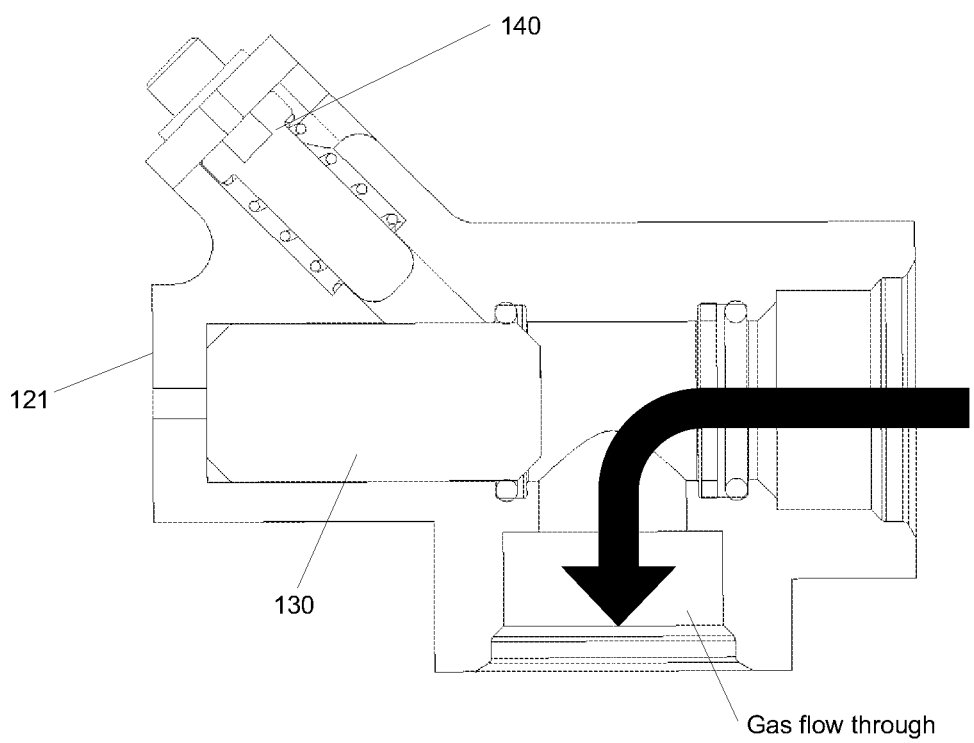
FIG. 2B shows the assembly of FIG. 2A with the piston in the open position.

When it is desired to release the pressurized fluid through the valve from the inlet and chamber A to the outlet 112, the firing cable device 160 is removed by pulling on the pull part 162, as shown in FIG. 2A which pulls the end 161 out of the space between the firing pin 140 and the end 123 of the firing pin cylinder 122. This allows the spring 150 to expand to cause the firing pin 140 to be retracted into the firing pin cylinder and out of engagement with the piston. Because the fluid pressure in chamber A acting on the first end 131 of the piston is high compared to the pressure in chamber B, the piston 130 is forced to move at high speed through chamber B towards the end wall 121 of the first housing part 110. Drain hole(s) 4 will prevent the air in chamber B becoming compressed. The piston 130 is thereby moved away from the inlet and outlet, thus opening a fluid communication channel between the inlet and the outlet and the pressurized fluid from chamber A and from the inlet flows out through the outlet as shown in FIG. 2B. This enables, e.g. pressurized gas to flow to and inflate an evacuation slide (not shown) but this is only one example of the use of such valves.

One of the problems associated with known valves is that, due to the large pressure difference between the pressure of the gas or other fluid in the first chamber A and the pressure of the fluid in the second chamber B, the piston 130, upon activation of the secondary valve and movement of the firing pin 140, is accelerated to very high velocities. This means that when the piston 130 makes contact with the end wall 121, it imparts a very large force on the end wall. Such impact can cause plastic deformation of the end wall or surrounding valve housing. In cases where the valve is opened repeatedly, the end wall 121 will become more and more deformed and can result in the wall having a bulge or breaking. In this case, the entire valve assembly will need to be removed and replaced.

The modified valve assembly according to the present disclosure is designed to reduce the impact of the piston on the end wall by providing a modified valve body and providing a guided piston, locking keys and a plug as will be described further below with reference to FIGS. 4 to 13.

Figure 3:
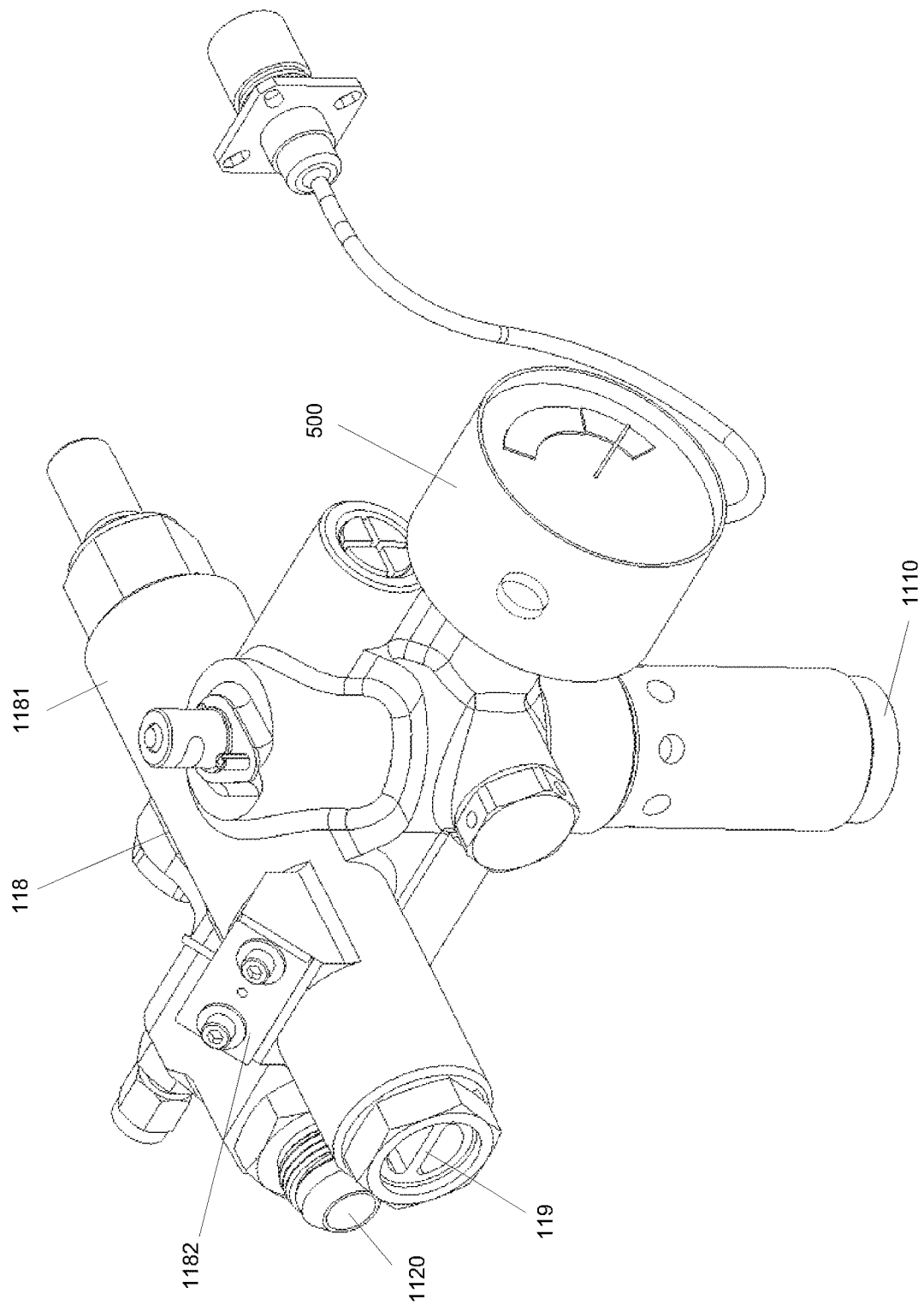
FIG. 3 is a perspective view of a valve assembly according to this disclosure.

FIG. 3 is a perspective view of an assembly according to the disclosure. The overall operation and external appearance of the assembly is the same as the known assembly described above and, indeed, it is an advantage of the assembly of the disclosure that it can be provided in the envelope of an existing assembly, and fitted for use in a system built for use with existing assemblies without substantial change.

The assembly has a valve body 118, a pressurized fluid inlet 1110 and a pressurized fluid outlet 1120. The closed end of the first housing part 1181 is provided by a plug 119. FIG. 3 also shows an optional pressure gauge 500 that can be used to monitor pressure in the assembly.

Figure 4:
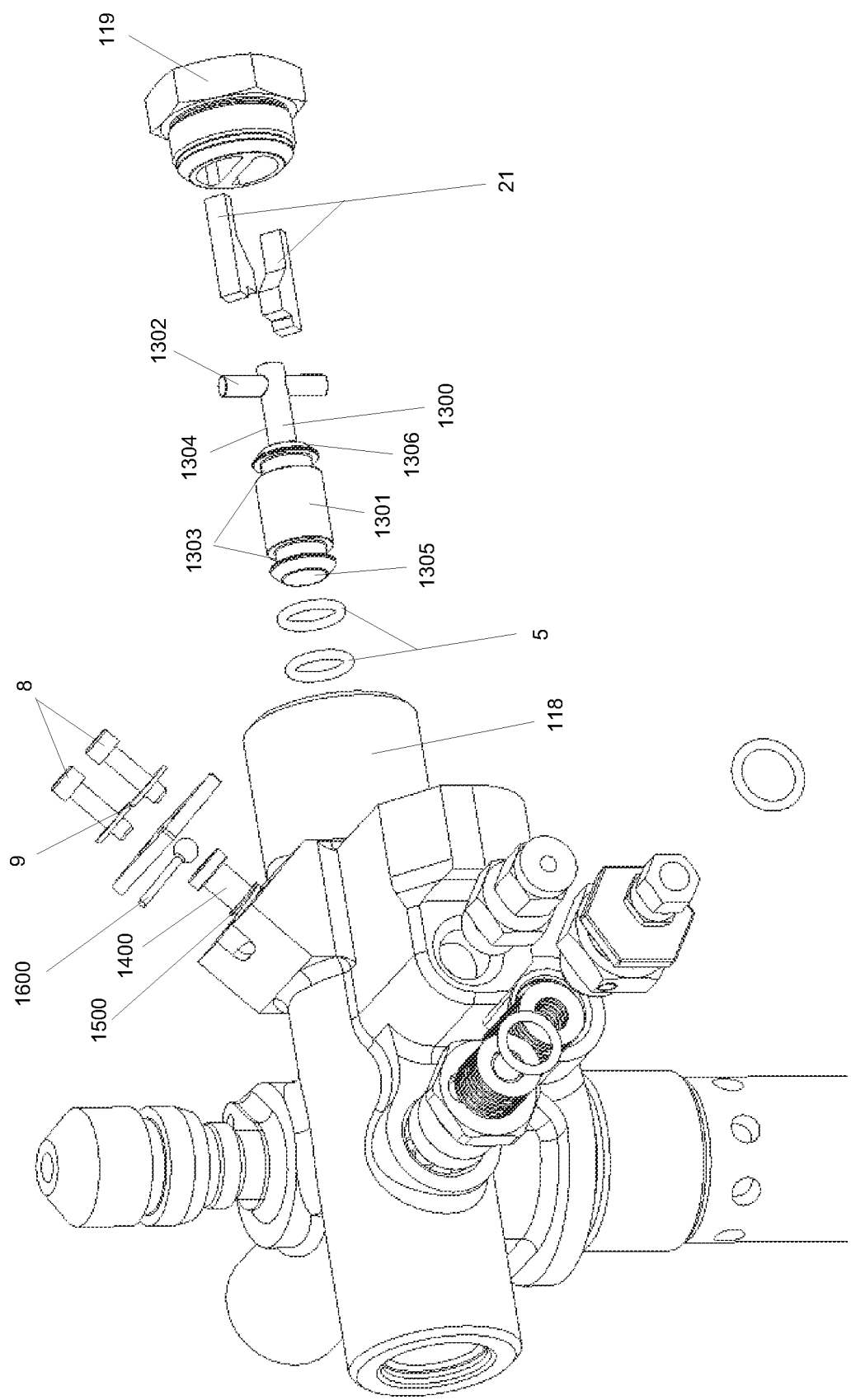
FIG. 4 is an exploded view of a valve assembly according to this disclosure.

More details of the modified assembly are shown in the exploded view of FIG. 4 (the orientation of which is reversed compared to FIG. 4). In particular, FIG. 4 shows a firing cable device 1600 which may be similar to the firing cable device 160 described above but can have any suitable configuration to cause the release of a blocking element such as a firing pin. A firing pin 1400, again which may be similar to that described above or another type of blocking device, is located in a firing pin cylinder defined by the second housing part 1182 and the second housing part is closed by e.g. a cap 9 which may be secured by e.g. screws 8. The configuration and operation of the firing pin and firing cable device is similar to that described above but the assembly of the disclosure is not limited to any particular piston blocking mechanism. All that is required is some releasable blocking means for holding the piston in the blocking position, against the force of the pressurized fluid acting on the piston, and some form of trigger to release the blocking means so as to allow the piston to move axially due to the fluid pressure.

In the first housing part 1181, which defines a piston cylinder 1185, a guided piston 1300 is mounted for axial movement and sealing is provided between the guided piston and the housing by O-rings 5 located in recesses 1303 around the guided piston. The closed end 1821 of the first housing part is closed by means of the plug 119. Locking keys 21 are provided to secure the piston as will be described further below.

The modified valve assembly according to this disclosure, and in particular the guided piston and the guide channels defined in the piston cylinder, is designed to convert the translational kinetic energy of the released piston moving to the open position under the input fluid pressure into rotational kinetic energy and to then to dissipate the accumulated rotational kinetic energy due to frictional resistance.

Figure 10:
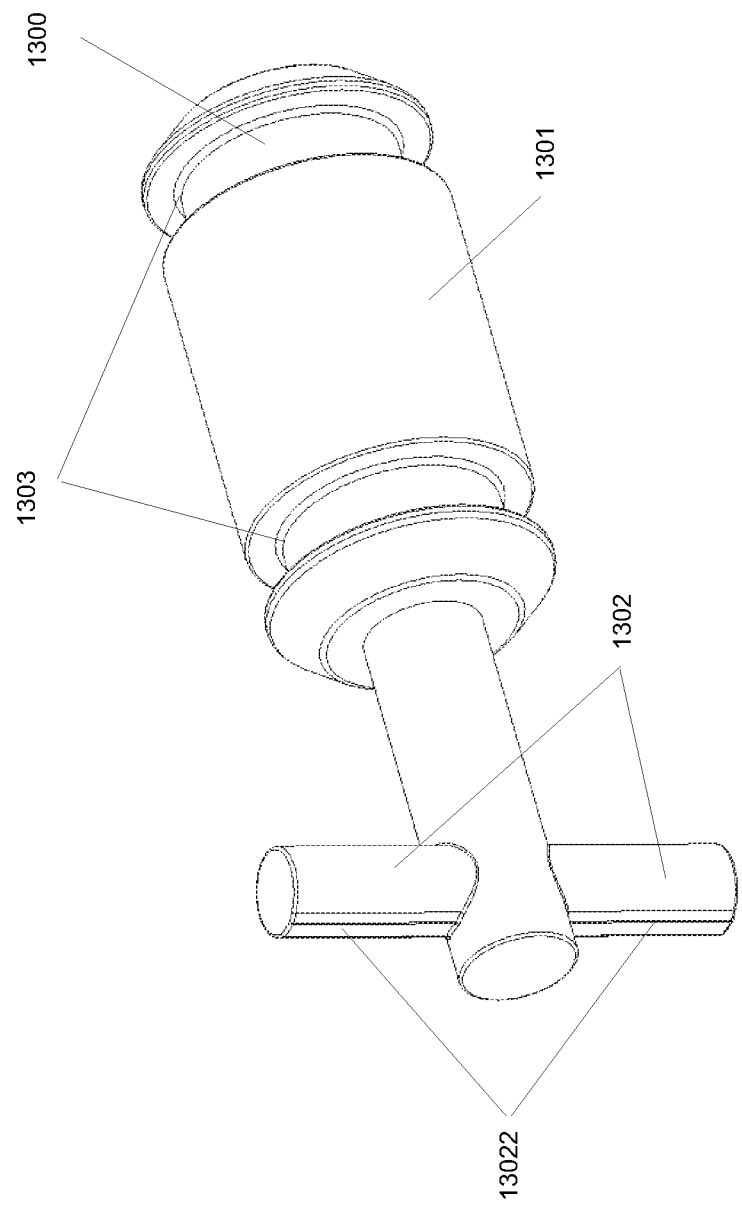
FIG. 10 shows the piston according to the disclosure in more detail.

As best seen in FIG. 10, the guided piston 1300 of the disclosure is formed with a cylindrical body part 1301 configured to fit closely within the piston cylinder but to be able to move axially through the cylinder. For additional sealing, the cylindrical body part may be provided with one or more grooves 1303 to receive O-rings 5 for providing a seal between the piston and the piston cylinder. In addition, the piston is provided with two radially extending guide pins 1302 which extend radially outwards relative to the cylindrical body 1301, that is the radial extent of the guide pins 1302 (defined relative to the cylinder axis, is greater than the diameter of the piston cylindrical body part. Whilst the guide pins 1302 can have different mounting positions and configurations, in the example shown they are provided extending radially out from a central shaft 1304 that extends axially from the cylindrical body part 1301. The guide pins may have a substantially circular cross-section but are preferably provided with a flattened portion 13022 to provide a contact interface with the walls of the circumferential groove at the end of axial travel of the piston as described further below.

Figure 6:
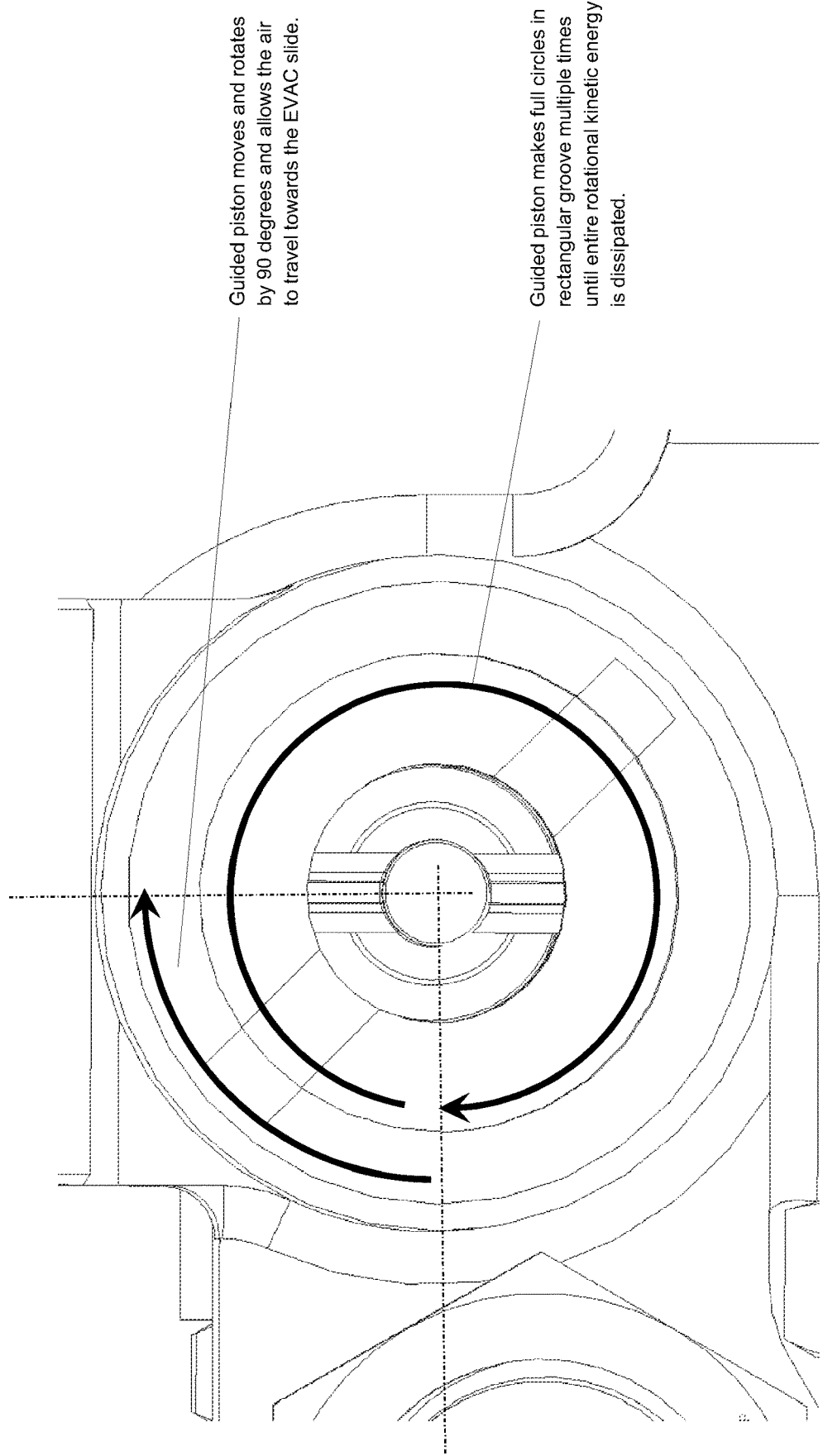
Figure 7B:
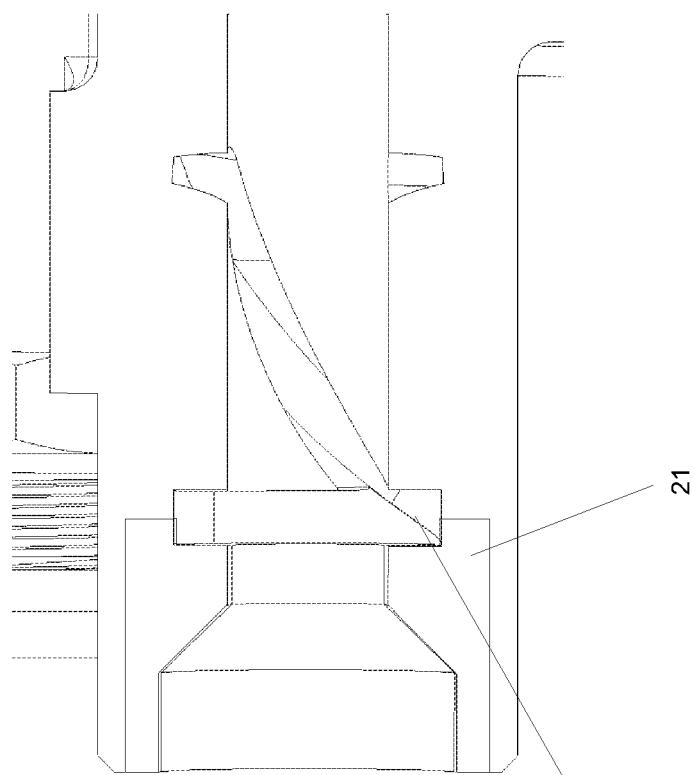
FIGS. 7A and 7B show in detail the helical and circumferential grooves according to the disclosure.
Figure 7A:
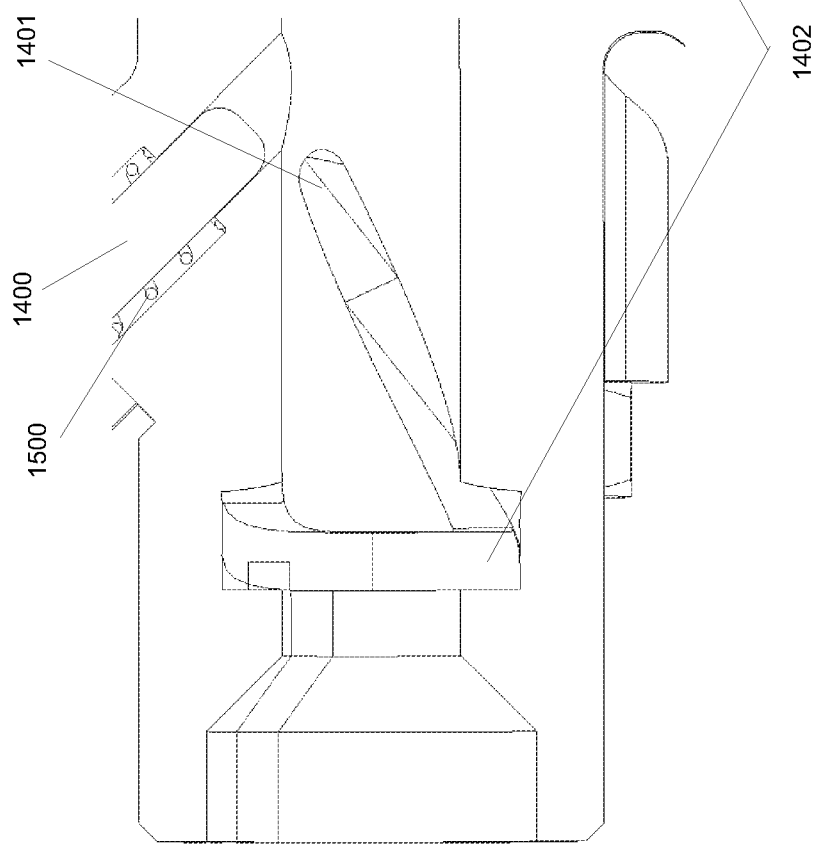

To generate the rotational motion of the piston as the piston is forced axially along the cylinder due to the fluid pressure acting on the piston once the locking pin is retracted, the inner wall of the piston cylinder is formed with helical guide grooves, 1401, best seen in FIGS. 7A and 7B, arranged to receive the guide pins and, at an end of the helical guide grooves, a circumferential rotation groove 1402 is formed in the inner wall of the piston cylinder. The interaction of the guide pins and the grooves to cause rotation of the piston and to thus convert its translational kinetic energy to rotational energy, will be described in more detail below, with reference to FIGS. 5 to 13.

Whilst in its simplest embodiment, the assembly may be provided with a simple cap or closure to close of the end of the first housing part, in one example, as shown, a modified plug 119 having two slots or holes 29 therein may be provided, as described further below, to simplify repositioning of the piston after use. Locking keys 21 may be provided to secure the piston, as will again be described further below.

In an initial state, as with the assemblies described above, the piston is located in the piston cylinder in a blocking position between the inlet and the outlet to prevent fluid e.g. air or gas flowing from the inlet to the outlet. Until pressurized fluid is provided to the inlet, e.g. via a primary valve (not shown), the pressures either end of the piston, p1, p2 will be substantially equal and there will be no movement of the piston relative to the housing. Once pressurized air is provided from the inlet, e.g. by opening a primary valve (not shown) that pressure in chamber p1 increases and acts on a first end 1305 of the piston cylindrical body 1301. The pressure in the chamber p2 at the other end 1306 of the piston is less than the pressure at p1, but the piston is prevented from moving under the force of pressure at p1 by means of the firing pin mechanism (as in FIG. 8A) which operates in the same way as described above and will not be described further in detail.

When the valve is to be opened to allow the pressurized fluid to flow to the outlet, the firing pin is retracted by pulling the firing cable device, again as described above. The pull force in one example is indicated by arrow F in FIGS. 11A and 11B. Once the firing pin has been removed from engagement with the piston, the higher pressure at p1 forces the piston to move axially in the cylinder against the lower pressure p2, as shown in FIG. 8B.

The guide pins 1302 extend radially into respective helical guide slots 1401 formed in the inner wall of the piston cylinder and so that the piston is forced in the axial direction due to the pressure differential between p1 and p2, the guide pins 1302 engage in the helical guide grooves thus causing the piston to rotate as it moves axially, thus converting its translational kinetic energy to rotational energy. As the piston nears the end of the cylinder, the helical guide grooves meet and lead into a circumferential groove 1402 and the guide pins are therefore guided into the cylindrical groove in which they continue to rotate without and axial movement in order to dissipate accumulated rotational kinetic energy (see FIG. 8C).

The helical guide grooves preferably have a non-linear pitch along their length to increase the energy conversion effect i.e. to increase the deceleration of the piston as it moves axially through the cylinder.

Figure 5A:
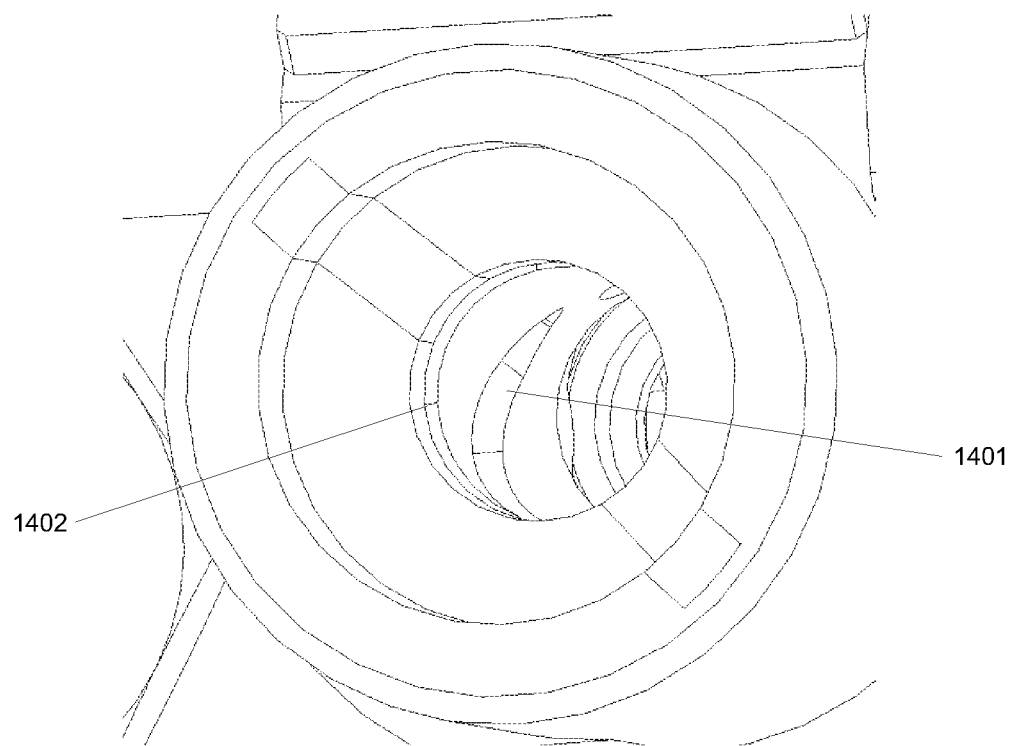
FIGS. 5A, 5B and 6 depict the piston cylinder from the end to show rotation of the piston relative to the housing.
Figure 5B:
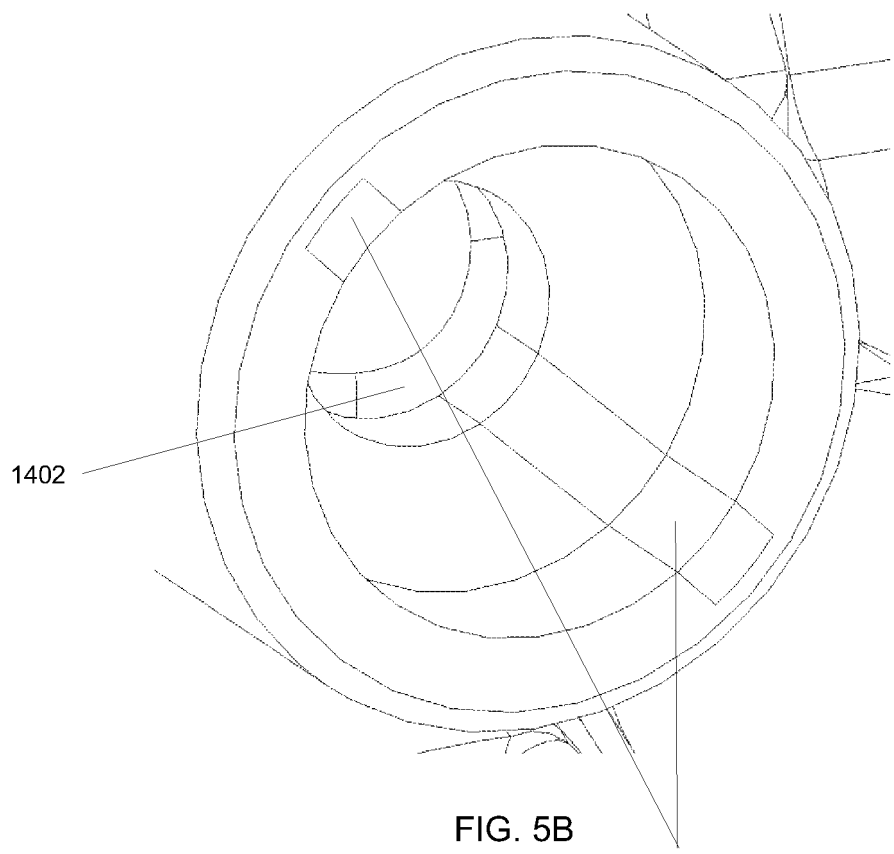

In one example, the location of the guide pins and the size and pitch of the helical grooves are such that the piston rotates e.g. 90 degrees over the length of axial travel. Once the pins are located in the circumferential groove, the piston can continue to rotate until its entire kinetic energy is dissipated. This is illustrated in FIGS. 5A, 5B and 6.

Figure 8A:
FIGS. 8A, 8B and 8C show in 3D the movement of the piston from the blocked position to the open position.
Figure 8A:
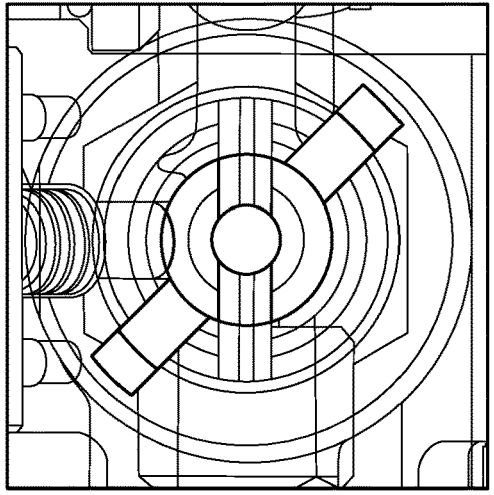
Figure 8B:
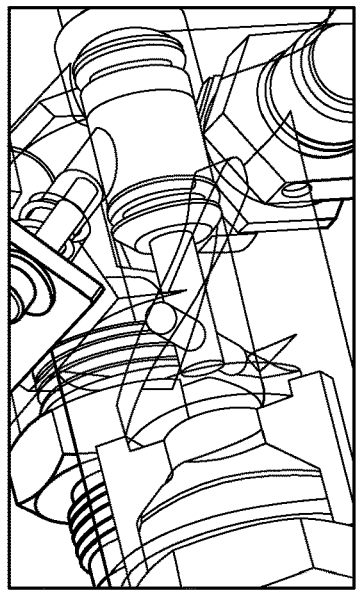
Figure 8B:
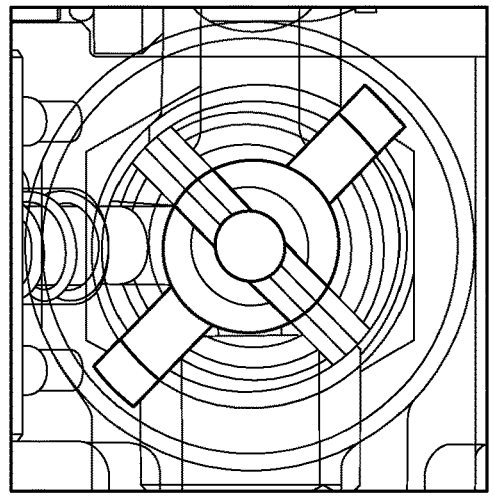
Figure 8C:
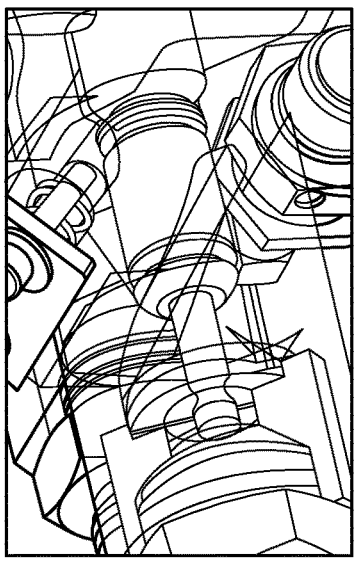
Figure 8C:
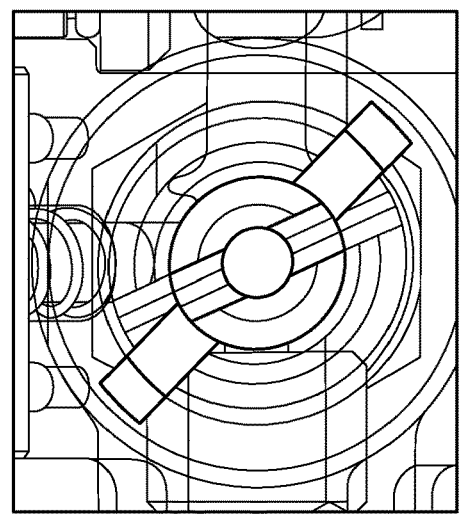
Figure 11B:
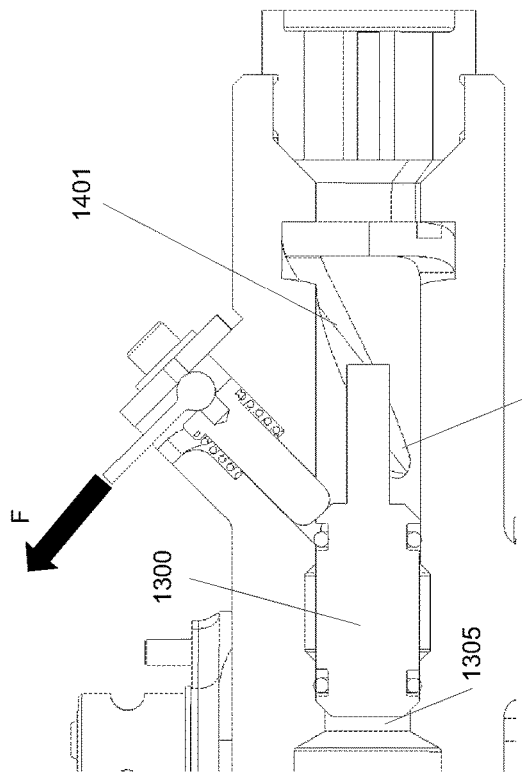
FIGS. 11A to 11C show the operation of the assembly according to the disclosure.
Figure 11C:
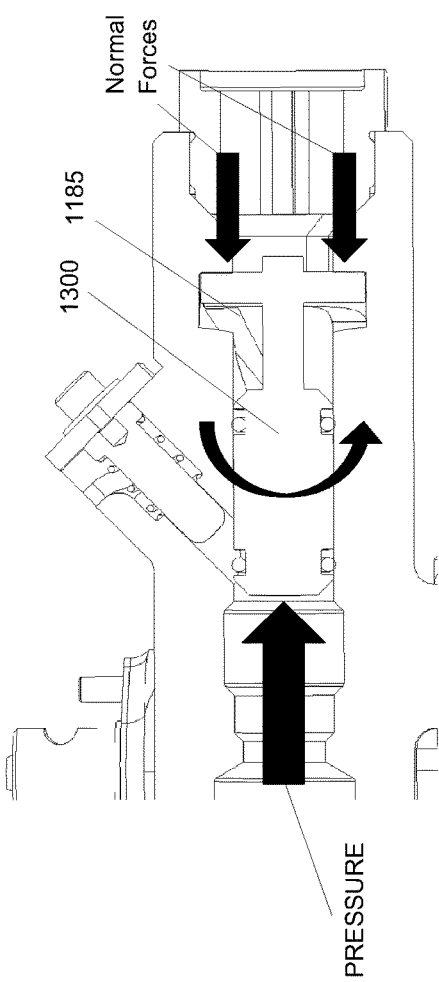
Figure 11A:
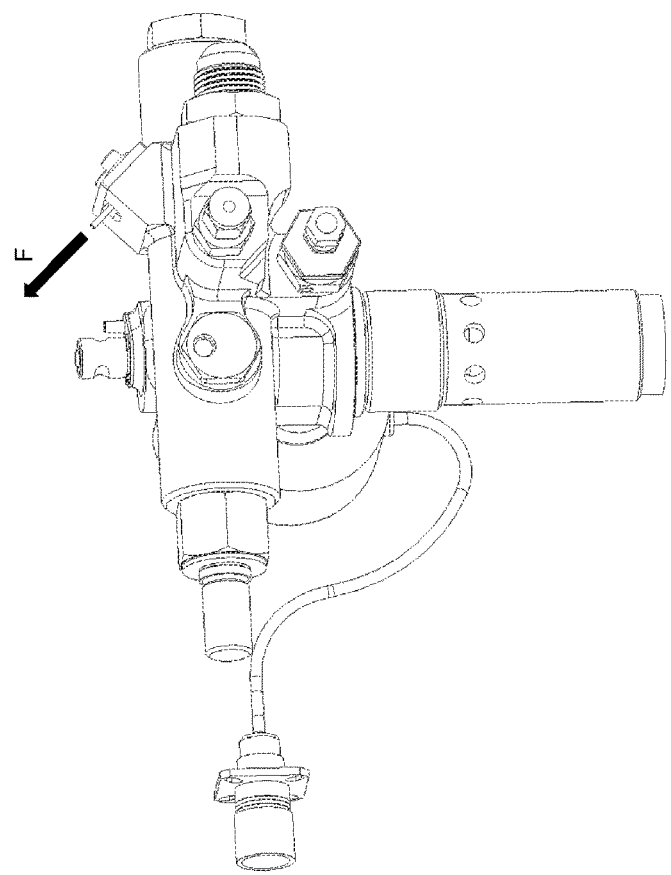

FIGS. 8A to 8C show, in more detail, the positions of the piston as it is released. FIG. 8A shows the piston in its blocked position with the firing pin acting against the piston to prevent its axial movement. In FIG. 8B, the firing pin has been retracted to release the piston. The piston is moved axially under pressure from the pressurized fluid and the engagement of the locking pins 1302 in the helical guide grooves causes the piston to rotate as it travels axially. Once the locking pins have reached the end of the helical guide grooves, they transition into a circumferential groove, which allows the piston to continue to rotate as shown in FIG. 8C. The operation of the piston is also shown in cross-section FIGS. 11A to 11C. The blocking mechanism secures the piston 1300 in the blocking position (FIG. 11B). This is released (force F in FIGS. 11A and 11B) and the piston travels axially along the cylinder under the force of the pressurized fluid with pressure p1, to travel towards the plug 119 and to open the flow passage from the inlet to the outlet (FIG. 11C).

Figure 12:
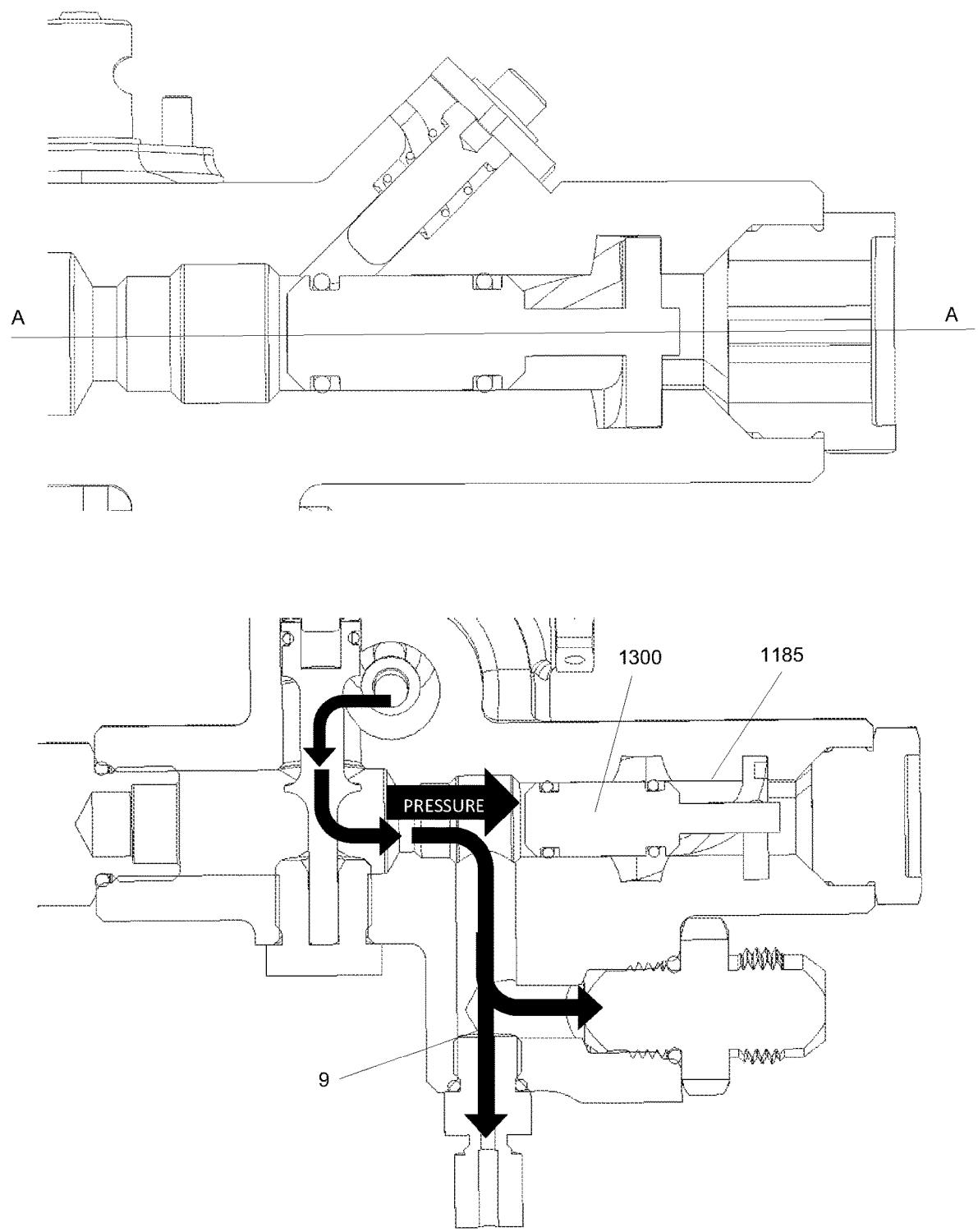
FIG. 12 shows the valve assembly with the piston in the open position.

As seen in FIG. 12, once the piston has reached the open position, the fluid is able to flow from the inlet to the outlet as indicated by arrow G, similar to the manner described in relation to FIGS. 2A and 2B.

When the piston has reached the end of its axial travel, as mentioned above, the guide pins 1302 are located in the circumferential groove and the piston continues to rotate in that groove while its kinetic energy is dissipated. If the guide pins are formed with a flat portion 13022, this flat surface will contact the wall of the circumferential groove. Normal forces are reactions caused by pressure acting on the first end of the piston body.

Figure 13:
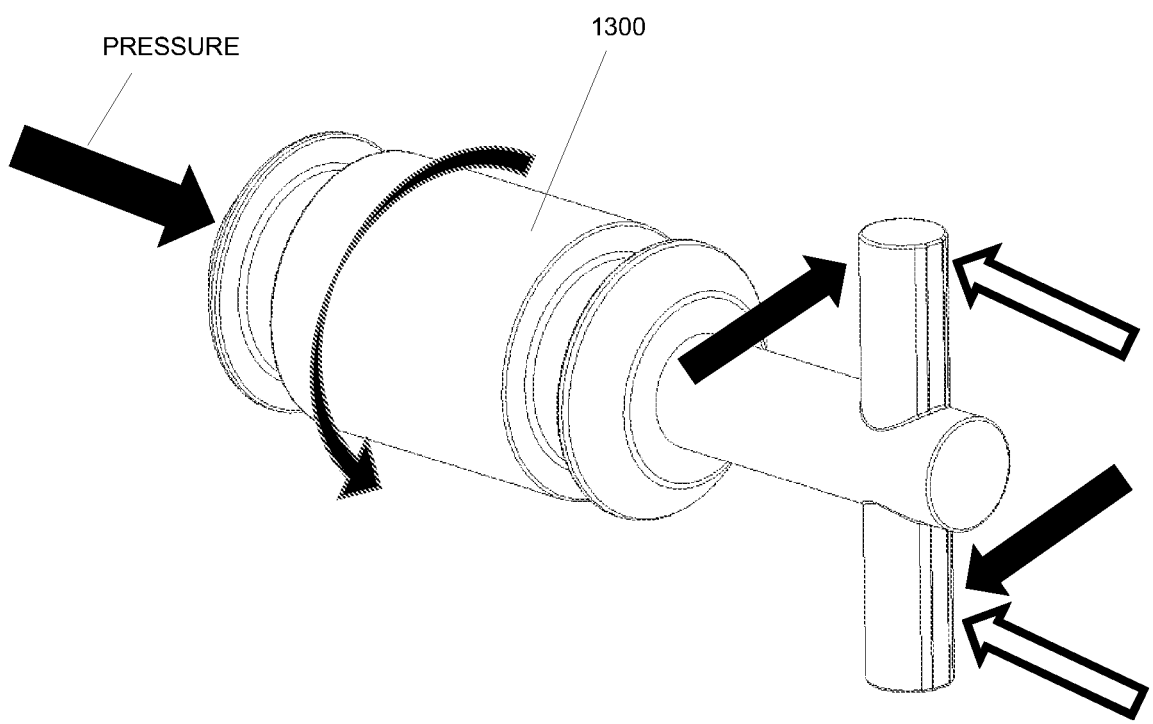
FIG. 13 is a view of the piston to show the forces acting thereon in the open position.

FIG. 13 shows the forces present when the piston is rotating in the circumferential groove. Normal forces 41 are generated by the piston being pressed against the wall of the circumferential groove due to the fluid pressure pushing against the first end of the piston. Due to the rotational movement 40 and normal forces 41 there will be a frictional resistance 42 represented by the pair of forces, and each is the product of the coefficient of friction and the normal force 41. The pair of forces acting in opposite directions will cause the piston to decelerate by dissipating its rotational kinetic energy.

Due to the presence of the radially extending guide pins 1302, a new way of assembling the piston and then re-positioning the piston after use is required.

One way to assemble the piston into the cylinder is via the end plug 119.

Figure 9:
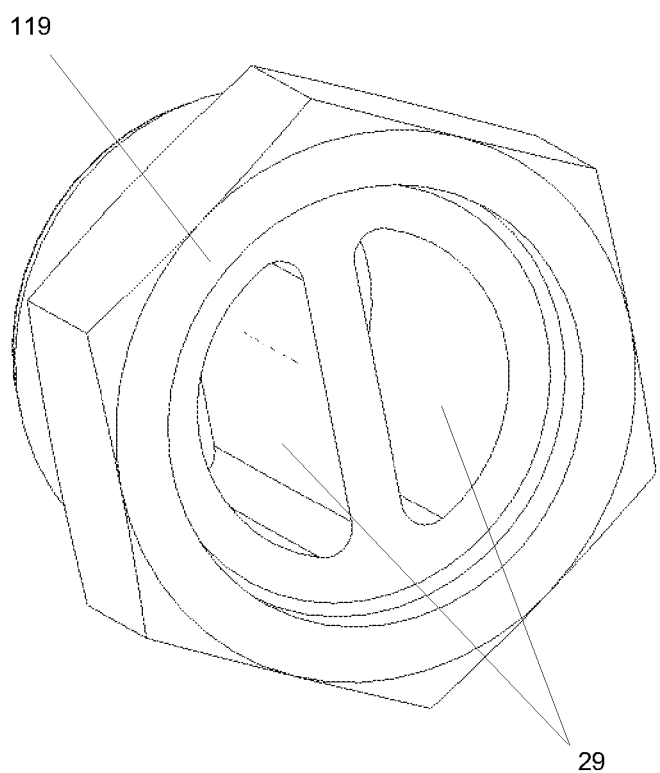
FIG. 9 shows the plug of the assembly of this disclosure in more detail.

As best seen in FIG. 9, the plug 119 is shaped with a hollow insert portion 1191 that closely fits inside the end of the piston cylinder and an end cap portion 1192 that fits against the outside of the piston cylinder end when assembled. To simplifying positioning of the piston, the plug is provided with two or more holes 29. Two or more locking keys 21 are provided that fit into the holes 29 in the plug 119 when the piston and plug are assembled in the housing.

To assemble the valve assembly, the locking keys 21 are inserted to complete the circumferential groove and the plug 119 is then inserted to lock the keys into position. The valve assembly can then be tested and can be tested multiple times. Each time, the piston locates to spin in the circumferential grove. After each test, the piston can be repositioned to its start position without removing the locking keys 21 from the plug 119. The piston can be accessed via the holes 29 e.g. by means of a prong or other elongate tool (not shown) that can push against the guide pins 1302 to force them back along the helical guide grooves to the start position.

It can be seen that with the assembly of this disclosure, specifically the design of the guided piston and the corresponding guide grooves, acts as an energy conversion system. As the piston travels over the helical grooves, the translational kinetic energy is converted to rotational kinetic energy. At the end of the helical path, accumulated rotational energy is dissipated by frictional resistance between the walls of the circumferential groove and the guide pins. This results in a significantly reduced impact between the piston and the assembly housing when the piston is released. The small impact force that will occur when the piston transfers from the helical groove to the circumferential groove is negligible, since the linear velocity by then is already small and rotational movement dominates by that stage.

Further, the assembly makes it easy to reposition the piston after use, on site, thus avoiding the need to disassemble the entire assembly. Most of the parts can be manufactured using additive manufacturing which reduces cost, manufacture time and also reduces the weight of the assembly.

The plug 119, providing the end wall of the piston housing, does not require a strong threaded engagement with the housing as the impact on the plug is very low. The main function of the plug is then to hold the locking keys in place, and so this can be a simple, lightweight, inexpensive part.

Although this disclosure has been described in terms of preferred examples, it should be understood that these examples are illustrative only and that the claims are not limited to those examples. Those skilled in the art will be able to make modifications and alternatives in view of the disclosure which fall within the scope of the appended claims.

The invention claimed is:

1. A valve assembly, comprising:
   a valve housing body extending along a longitudinal axis X between a first end and a second end and defining a cylindrical passage therethrough from the first end to the second end;
   a fluid inlet at the first end for receiving a pressurized fluid;
   a fluid outlet provided in between the first and second end of the housing body; and
   a piston provided in the cylindrical passage, the piston being axially movable between a first position where the fluid outlet is blocked by the piston such that the piston blocks the flow of fluid from the inlet to the outlet, and a second position where the fluid outlet is not blocked by the piston and a fluid flow path is formed from the fluid inlet to the fluid outlet,
   wherein the valve assembly further comprises a helical guide groove formed in the cylindrical passage and the piston comprises radially extending guide pins configured to engage in the helical guide groove such that as the piston moves axially from the first position, the guide pins travel along the helical guide groove to cause rotation of the piston relative to the housing body, and
   wherein the valve assembly further comprises a circumferential groove at an end of the helical guide grooves such that the guide pins travel from the helical guide grooves into the circumferential groove, wherein when the piston is in the second position the guide pins rotate around the circumferential groove.

2. The assembly of claim 1, wherein an outer diameter of a body of the piston is substantially equal to an inner diameter of the cylindrical passage and wherein the guide pins extend radially beyond the outer diameter of the body of the piston.

3. The assembly of claim 1, wherein the piston comprises a cylindrical body having a first end and a second end, the first end configured to be acted on by the fluid from the inlet, and wherein the guide pins extend radially from the second end.

4. The assembly of claim 3, wherein the piston includes a shaft extending axially from the second end of the body and wherein the guide pins extend radially from the shaft.

5. The assembly of claim 1, wherein the guide pins have a flattened surface portion.

6. The assembly of claim 1, wherein the piston is provided with a seal to sealingly engage with the housing body.

7. The assembly of claim 1, further comprising a firing pin for holding the piston in the first position against pressure of fluid from the inlet.

8. The assembly of claim 7, wherein the firing pin is provided in a second assembly housing part branched from the valve housing body defining the cylindrical passage, the firing pin arranged to protrude into the cylindrical passage to block axial movement of the piston from the first position.

9. The assembly of claim 8, wherein the firing pin is configured to be movable away from engagement with the piston, thereby releasing the piston to move axially along the passage towards the second position.

10. The assembly of claim 7, wherein, when the piston is in the first position, the firing pin is held in engagement with the piston by a firing cable device.

11. The assembly of claim 1, wherein the second end of the housing is closed by a removable plug.

12. The assembly of claim 11, wherein the plug is provided with holes therethrough via which the guide pins of the piston can be contacted by an externally applied tool.

13. The assembly of claim 11, further comprising locking pins configured to be inserted into the circumferential groove, and wherein the plug secures the locking pins to complete the circumferential groove.

14. The assembly of claim 1, wherein the outlet is in fluid communication with an inflatable device.

15. The assembly of claim 14, wherein the inflatable device is an evacuation slide of an aircraft.

* * * * *